Sept. 26, 1944.  E. O. LANCE  2,358,933
OIL FILTER AND COOLER
Filed June 13, 1944   2 Sheets-Sheet 1
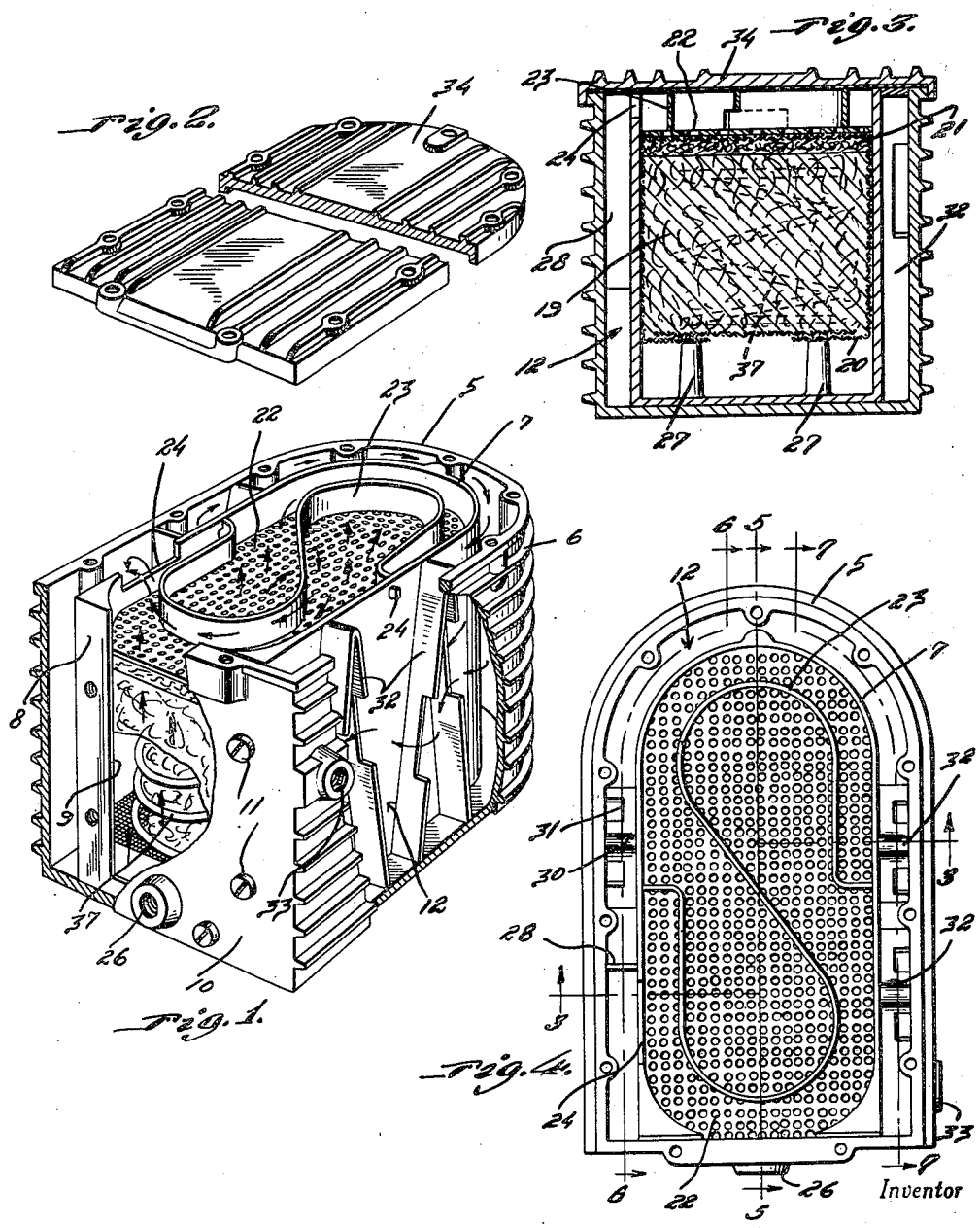
Inventor
Ermil Orren Lance
By Clarence A. O'Brien
Attorney

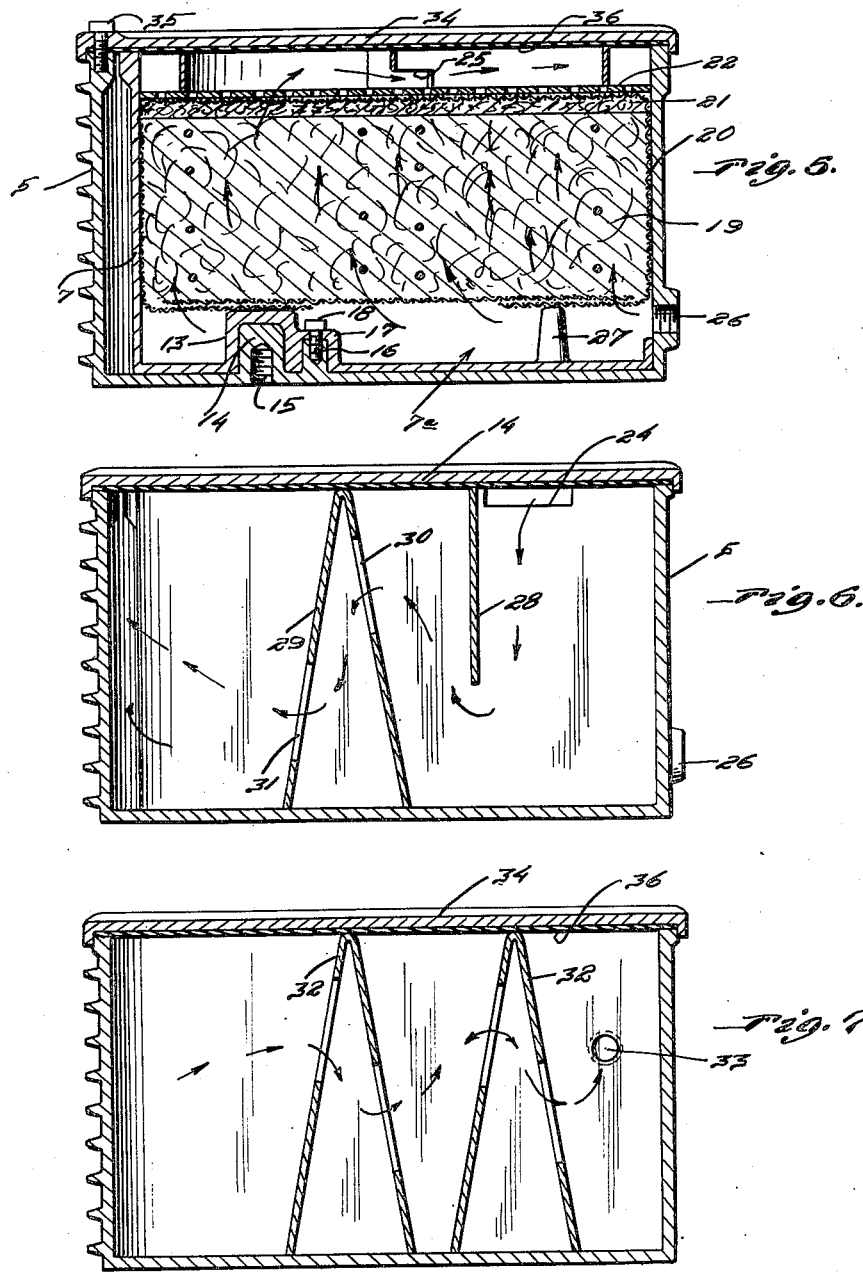

Patented Sept. 26, 1944

2,358,933

UNITED STATES PATENT OFFICE 2,358,933

OIL FILTER AND COOLER

Ermil O. Lance, Hot Springs, Ark., assignor to
W. T. Renfrow, Neosho, Mo.

Application June 13, 1944, Serial No. 540,065

5 Claims. (Cl. 210—122.5)

This invention relates to oil filters and coolers of the type used on internal combustion engines for filtering and cooling crank case oil; the object of the invention being to provide a medium whereby the oil pumped from the crank case will be thoroughly filtered and cooled prior to its return to the case.

The present invention, together with its objects and advantages will be best understood from a study of the following description taken in connection with the accompanying drawings wherein—

Figure 1 is a perspective view of the device with the cover thereof removed, and certain parts broken away and shown in section.

Figure 2 is a perspective view of the cover plate of the device.

Figure 3 is a detail vertical sectional view taken substantially on the line 3—3 of Figure 4.

Figure 4 is a top plan view of the device with the cover plate removed.

Figures 5, 6 and 7 are detail sectional views taken substantially on the lines 5—5; 6—6; and 7—7, respectively, of Figure 4.

Referring more in detail to the drawings it will be seen that the device comprises an outer shell or casing 5 the peripheral wall of which, except for one end, is provided with cooling fins 6 as shown.

Disposed within the outer casing or shell 5 is an inner casing or shell 7 that in top plan is substantially the same in shape as the outer shell or casing 5 and has a flat end 8, open as at 9, and disposed against the flat end 10 of the outer casing or shell 5 as suggested in Figure 1; the shells 5 and 7 being secured together at the ends 8 and 10 thereof through the medium of screws or other fastening elements 11, as also best shown in Figure 1.

Except at the ends mentioned the shells 5 and 7 have the peripheral walls thereof spaced as shown to provide therebetween an oil-circulating and cooling chamber 12.

As shown in Figure 4 the bottom wall of the shell 7 is provided with a formation 13 that presents a downwardly opening socket to receive a formation 14 provided on the bottom of the outer casing 5 and presenting an upwardly extending lug. The formation 14 is provided with a threaded bore 15 as shown to facilitate the attachment, to the device, of a bracket or other attaching medium for securing the device in the proper position with respect to the internal combustion engine, and in connection with which it is to be used.

Further the bottom walls of the casings or shells 5 and 7 are complementarily formed as shown in Figure 5 to provide on the bottom wall of the shell 5 an inwardly extending projection, and on the bottom wall of the shell 7 a socket receiving said extension, the latter being indicated by the reference numeral 16, and the former by the reference numeral 17.

The extension 16 is secured within the socket 17 through the medium of a screw or similar fastening element 18. Thus the shells or casings 5 and 7 are rigidly secured against relative movement.

The shell or casing 7 constitutes a filtering chamber and has positioned therein a filtering mass 19 of any suitable material. The mass 19 is encased in a wrapping of wire cloth or the like 20 as shown to advantage in Figure 4.

Disposed over the top surface of the mass 19 is a sheet 21 of felt or similar material; the same being within the confines of the wrapping 20, and superimposed upon the felt covered surface of the mass 19 is a perforated strainer plate 22 of metal or other suitable material.

Disposed on the strainer plate 22 is a sinuous or substantially S-shaped baffle member 23 that, in the present instance is shown anchored in position within the confines of the peripheral wall of the casing or chamber 7 by having the extremities thereof reduced to form lugs 24 that are projected through openings provided therefor in the wall of the casing or shell 7, as shown in Figure 1.

The shell or casing 7 has provided in the peripheral wall thereof an overflow notch 24, and the baffle member 23, intermediate its ends, is provided in the lower edge thereof with a notch 25; the latter being best shown in Figure 5.

At the end 10 thereof the shell or casing 5 is provided with an inlet nipple 26 to which is connected a suitable conduit (not shown) leading from the internal combustion engine so that the oil therefrom will pass directly into the filtering chamber 7a formed by the inner shell or casing 7 and beneath the filtering medium 19 which latter, as shown in Figure 5, is supported in spaced relation to the bottom of the chamber 12 through the medium of short lugs 27 rising from the bottom of the shell 7.

The oil so entering the chamber 7 will percolate upwardly through the filtering mass 19, and member 21, to spread out over the surface of the screen 22; the oil so passing up through the mass 19 and felt sheet 21 being thus cleaned from all impurities and foreign matter.

As the oil percolates through the plate 22 in seeking a level on the plate 22, said oil will be caused to flow in directions indicated by the arrows in Figure 1, the oil on one side of the baffle 23 passing to the other side thereof through the aforementioned notch 25 to finally overflow from the chamber 7a into the cooling chamber 12.

Disposed in the chamber 12 at one side thereof and adjacent to the notch 24 is a vertical baffle plate 28 that fills the space between the confronting wall portions of casings or shells 5 and 7 and terminates short of the bottom of chamber 12 as shown in Figure 5.

Also disposed in the chamber 12 at said side of the chamber and at the side of the baffle 28 opposite to the notch 24 is an inverted V-shaped baffle 29 that has in one leg thereof an opening 30 and in a second leg thereof an opening 31, the opening 30 being disposed in a plane above the opening 31 so that in order to pass the baffle 29 the oil will have to flow upwardly through the opening 30 and then downwardly to pass through the opening 31, whence it will then flow through the chamber 12 to the opposite side thereof. In this second side of the chamber 12 there are provided a pair of inverted V-shaped baffles 32—32, that are substantially identical in construction with the baffle 29 and are correspondingly equipped with openings, as shown in Figure 1, causing the oil to again take a somewhat circuitous course in reaching the oil outlet 33 provided for the chamber 12 at this side of the chamber.

It will be apparent that the oil in spilling into the chamber 12 at the notch 24 will cause to circulate through the chamber 12 passing through the baffles 29 and 32 to reach the outlet 33 which will, of course, be connected to the crank case through the medium of a conduit which will serve to return the oil thus filtered and cooled back to the crank case.

Since obviously the use of the baffles will retard the flow of oil in its travel to the outlet 33, sufficient contact of the oil with the surface of the shell 5 is assured for the effective cooling of the oil subsequent to the filtering thereof.

Completing the device is a suitable cover plate 34 that serves as a closure common to the shells or casing 5 and 7 and is secured in position on the device through the medium of screws or other fastening elements 35.

Also the cover plate 34 is provided with a suitable gasket 36 to insure a non-leak joint between the top edges of the walls of the casing or shells 5 and 7 and the plate 34; and also leaving but the notch 24 as the medium for escape of the oil from the filtering chamber 7a to the cooling chamber 12.

To maintain the filtering waste material 19 against packing down and becoming compressed, and consequently to keep it in an efficient expanded condition, there are placed within the mass 19 two or more coil springs 37 as shown in Figures 1 and 3.

It is thought that the simplicity of the device together with its construction, utility and advantages will be appreciated and clear to those skilled in the art without further detailed description.

It is also to be understood that while I have herein shown and described a preferred embodiment of the invention, I claim all such forms of the invention to which I am entitled in view of the prior art and scope of the appended claims.

Having thus described the invention what is claimed as new is:

1. In an apparatus of the character set forth, adapted for use with an internal combustion engine, a pair of nested shells providing an inner filtering chamber and an outer cooling chamber, filtering means supported in the filtering chamber above the bottom thereof and having its top surface below the top of said filtering chamber, said filtering chamber having in the peripheral wall thereof and above the top surface of said filtering means an aperture for the overflow of the filtered liquid from the filtering chamber to said cooling chamber, an inlet at one end of the shells through which oil may pass directly into the filtering chamber beneath said filtering means, and an outlet at the side of the cooling chamber farthest remote from said overflow aperture and through which the filtered oil flowing through said cooling chamber may escape therefrom, and baffles arranged in said cooling chamber; certain of said baffles extending from the top to the bottom of said chamber and of a width corresponding to the width of the chamber and provided with openings arranged in different planes to permit flow of the oil through the cooling chamber toward said outlet.

2. In an apparatus for use with an internal combustion engine for filtering and cooling the oil used thereby, a filtering chamber, a cooling chamber circumjacent said filtering chamber, a filtering mass supported in the filtering chamber above the bottom of said chamber with the top surface of said mass below the top of said filtering chamber, a sinuous baffle interposed between the top of said filtering mass and the top of said chamber and secured at one end thereof to one side of said filtering chamber at an opposite end thereof to an opposite side of said filtering chamber, and being provided intermediate its ends with a notch to permit passage of the oil percolating through the filtering mass from one side to the other of said baffle, said filtering chamber being also provided above the top surface of said filtering mass with a single overflow opening for the overflow of the filtered oil into said cooling chamber, an inlet through which oil may pass into said filtering chamber, below said filtering mass, and an outlet for said cooling chamber remote from said overflow opening.

3. In an apparatus for use with an internal combustion engine for filtering and cooling the oil used thereby, a filtering chamber, a cooling chamber circumjacent said filtering chamber, a filtering mass supported in the filtering chamber above the bottom of said chamber with the top surface of said mass below the top of said filtering chamber, a sinuous baffle interposed between the top of said filtering mass and the top of said chamber and secured at one end thereof to one side of said filtering chamber at an opposite end thereof to an opposite side of said filtering chamber, and being provided intermediate its ends with a notch to permit passage of the oil percolating through the filtering mass from one side to the other of said baffle, said filtering chamber being also provided above the top surface of said filtering mass with a single overflow opening for the overflow of the filtered oil into said cooling chamber, an inlet through which oil may pass into said filtering chamber below said filtering mass, and an outlet for said cooling chamber remote from said overflow opening, and baffle means arranged in said cooling chamber intermediate said overflow opening and said oil outlet for retarding the flow of oil through the cooling chamber towards said outlet.

4. In an apparatus for use with an internal combustion engine for filtering and cooling the oil used thereby, a filtering chamber, a cooling chamber circumjacent said filtering chamber, a filtering mass supported in the filtering chamber above the bottom of said chamber with the top surface of said mass below the top of said filtering chamber, a sinuous baffle interposed between the top of said filtering mass and the top of said chamber and secured at one end thereof to one side of said filtering chamber at an opposite end thereof to an opposite side of said filtering chamber, and being provided intermediate its ends with a notch to permit passage of the oil percolating through the filtering mass from one side to the other of said baffle, said filtering chamber being also provided above the top surface of said filtering mass with a single overflow opening for the overflow of the filtered oil into said cooling chamber, an inlet through which oil may pass into said filtering chamber below said filtering mass, and an outlet for said cooling chamber remote from said overflow opening, and baffle means arranged in said cooling chamber intermediate said overflow opening and said oil outlet for retarding the flow of oil through the cooling chamber towards said outlet, certain of said baffles extending from the top to the bottom of said cooling chamber and from one wall to the opposite wall of said cooling chamber and provided with openings to permit the oil to flow therebeyond; the openings being arranged in different planes, as and for the purpose specified.

5. In an apparatus of the character set forth, adapted for use with an internal combustion engine, a pair of nested shells providing an inner filtering chamber and an outer cooling chamber, filtering means supported in the filtering chamber above the bottom thereof and having its top surface below the top of said filtering chamber, said filtering chamber having in the peripheral wall thereof and above the top surface of said filtering means an aperture for the overflow of the filtered liquid from the filtering chamber to said cooling chamber, an inlet at one end of the shells through which oil may pass directly into the filter chamber beneath said filtering means, and an outlet at the side of the cooling chamber farthest remote from said overflow aperture and through which the filtered oil flowing through said cooling chamber may escape therefrom; and a sinuous baffle interposed between the top of said filtering means and the top of said chamber and provided intermediate its ends with a notch to permit passage of the oil circulating through the filtering means from one side to the other of said baffle, and baffle means arranged in said cooling chamber for retarding the flow of oil from the cooling chamber toward said outlet.

ERMIL O. LANCE.